United States Patent
Datz

(10) Patent No.: US 9,409,528 B1
(45) Date of Patent: Aug. 9, 2016

(54) LIGHTBAR MOUNTING SYSTEM

(71) Applicant: Star Headlight & Lantern Co., Inc., Avon, NY (US)

(72) Inventor: R. Michael Datz, Rochester, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 141 days.

(21) Appl. No.: 13/958,223

(22) Filed: Aug. 2, 2013

(51) Int. Cl.
*B60R 9/048* (2006.01)
*B60Q 1/26* (2006.01)

(52) U.S. Cl.
CPC .............. *B60R 9/048* (2013.01); *B60Q 1/2611* (2013.01)

(58) Field of Classification Search
CPC ........................... B60Q 1/2611; F21V 21/0816
USPC .......................... 362/493, 487, 382, 396, 388
See application file for complete search history.

(56) References Cited

U.S. PATENT DOCUMENTS

| | | |
|---|---|---|
| 2,596,860 A | 5/1952 | McCrory, et al. |
| 3,064,868 A | 11/1962 | Treydte |
| 3,385,488 A | 5/1968 | Bronson |
| 3,677,451 A | 7/1972 | Burland |
| 3,858,774 A | 1/1975 | Friis |
| 4,104,614 A | 8/1978 | Litman |
| 4,114,789 A | 9/1978 | Blaylock et al. |
| D254,603 S | 4/1980 | Gosswiller |
| 4,259,660 A * | 3/1981 | Oliver .................. B60Q 1/2611 116/40 |
| 4,345,705 A | 8/1982 | Graber |
| 4,620,268 A | 10/1986 | Ferenc |
| 4,688,706 A | 8/1987 | Thulin |
| 4,778,092 A | 10/1988 | Grace |
| 4,995,538 A | 2/1991 | Marengo |
| 5,366,128 A | 11/1994 | Grim |
| D355,142 S | 2/1995 | Wagner |
| 5,729,016 A | 3/1998 | Klapper et al. |
| 5,785,474 A | 7/1998 | Kinouchi et al. |
| 5,829,654 A | 11/1998 | Weger, Jr. et al. |
| 5,845,828 A | 12/1998 | Settelmayer |
| 5,848,743 A | 12/1998 | Derecktor |
| 5,884,997 A | 3/1999 | Stanuch et al. |
| RE36,245 E | 7/1999 | Stanuch et al. |
| 5,931,359 A | 8/1999 | Zona |
| 5,984,155 A | 11/1999 | Stapleton |
| 6,722,776 B1 | 4/2004 | Lyons et al. |
| D491,482 S | 6/2004 | Chiang |
| 6,843,394 B2 | 1/2005 | Aki |
| 6,845,893 B2 | 1/2005 | Nelson |
| 7,244,053 B2 | 7/2007 | Bader et al. |
| 7,387,414 B2 | 6/2008 | Helms et al. |
| 7,419,286 B2 | 9/2008 | Stein |
| 7,517,120 B2 | 4/2009 | Smith |
| 2006/0273122 A1 * | 12/2006 | Bogoslofski .............. B60R 9/08 224/324 |
| 2008/0304276 A1 | 12/2008 | Helms et al. |
| 2010/0230566 A1 | 9/2010 | Neufeglise |

* cited by examiner

*Primary Examiner* — Laura Tso
(74) *Attorney, Agent, or Firm* — Kenneth J. LuKacher Law Group

(57) ABSTRACT

A universal system for mounting lightbars on any vehicle's roof curvature without the need for changing parts in the mounting. The mounting system comprises two mounting assemblies. Each assembly has a first bracket attached to the roof, particularly in the gutter or door jamb, which runs along the edge of the roof, a second bracket attached to the underside of the lightbar, and a third bracket coupled to said first bracket by a flexible strip or strap. The third bracket is movable laterally with respect to the second bracket to a fixed position to stretch the strip so that it lies flush upon the roof. Two of the mounting assemblies are attached to the lightbar at opposite ends thereof for mounting the lightbar along the right and left sides of the roof of a vehicle.

21 Claims, 6 Drawing Sheets

US 9,409,528 B1

LIGHTBAR MOUNTING SYSTEM

FIELD OF THE INVENTION

The present invention relates to a system for mounting lightbars on the roof of vehicles, and more particularly to a universal lightbar mounting system, apparatus, and method for mounting a lightbar on vehicle roofs of different curvature.

BACKGROUND OF THE INVENTION

Presently a large inventory of brackets or gutter clips is needed to accommodate the many different roof and gutter styles of different vehicle models on which lightbars are assembled. It is desirable to reduce the inventory of lightbar mounting parts and facilitate the marketing of the lightbars by equipping each lightbar with the same mounting. Various attempts to provide universal lightbar mounts which accommodate different styles and curvatures of vehicle roofs has led to complex mounting mechanisms which have not achieved substantial commercial success, such as described, for example, in U.S. Pat. Nos. 4,114,789 and 7,517,120. The need, and the solutions proposed, for providing a mount for lightbars which may be used with different styles of vehicle roofs is also described in U.S. Patent Application Publication No. 2010/0230566. The design for typical clips or brackets is shown in U.S. Pat. No. 7,244,053.

Straps have also been proposed for holding down carriers, racks, and lightbars on vehicle roofs, see U.S. Pat. Nos. 2,596,860 and 4,995,538. Such strap designs as have been proposed are not adapted for use in mounting lightbars on vehicle roofs of different curvature and where the lightbars may themselves be of different length. It is also desirable that noise engendered by air passing through the mounting device be minimized so that the mounting does not interfere with the use and performance of the vehicle on which the lightbar is mounted.

SUMMARY OF THE INVENTION

Accordingly it is the principal object of the present invention to provide an improved lightbar mounting system.

It is a more specific object of the invention to provide a universal lightbar mounting system capable of mounting a lightbar on many different vehicles using like parts in each mounting system despite different styles of vehicle roofs in terms of curvature and width.

It is still a further object of the present invention to provide an improved universal lightbar mounting system utilizing a flexible member or strap to mount the lightbar on different styles of vehicle roofs and minimizes noise due to wind passing over the lightbar mounting by maintaining the strap of the mounting flush against the surface of the roof of the vehicle.

Briefly described, a lightbar mounting system in accordance with the invention utilizes mounting assemblies at opposite ends of the lightbar. These assemblies include a bracket mounted to the lightbar and having a foot which extends to the roof of the vehicle. A subassembly utilizes a strap, or belt strip, having loops at opposite ends thereof which are attached to each of a pair of brackets, one of which is attachable at the edges of the roof of the vehicle to the gutter or door jamb. The bracket attached at the other end of the strap or belt strip is moveable upon the bracket having the foot extending to the roof of the vehicle. The sub-assembly is assembled with the bracket having the foot via a floating connection which enables the moveable bracket to move sufficiently to stretch the strap or belt over and against the surface of the roof of the vehicle. When stretched to the position against the roof of the vehicle, the floating connection is used to fix the position of the moveable bracket upon the bracket having the foot. This mounting system makes use of a strap in a unique manner in order to provide for universal mounting for lightbars.

The present invention further embodies a method for mounting a lightbar on a curved roof of a vehicle having the steps of looping a flexible strap around an attachment to the roof at an edge thereof, looping the strap over the roof and around a bracket moveably attached to the lightbar, moving the bracket to stretch the strap to conform to the roof, and fixing the moveable bracket to the lightbar. The steps of this method are carried out at opposite ends of the lightbar along different sides of the roof with different ones of the strap and bracket.

The present invention still further embodies an apparatus for mounting a lightbar onto the vehicle roof with respect to one of the left or right sides thereof. The apparatus having a first bracket attachable to one of a gutter or door jamb along an edge of the roof of a vehicle, a second bracket attachable to the base of a lightbar along the left or right side thereof and having a foot positionable against a roof of the vehicle, a third bracket movable with respect to the second bracket to a fixed position with respect to the second bracket, and a flexible member, e.g., strip, strap or band, coupled between the first bracket and third bracket. In operation, when the first bracket is attached to the edge of the roof of a vehicle and the second bracket is attached to a lightbar with the foot positioned against the roof of a vehicle, the third bracket is then moved to the fixed position with respect to the second bracket to substantially conform the flexible member to the curvature of the roof of the vehicle between the first bracket and the third bracket. The apparatus is provided along each of the left and right sides of the roof to rigidly couple the lightbar to the roof.

BRIEF DESCRIPTION OF THE DRAWINGS

The foregoing and other objects features and advances of the invention will become more apparent from a reading of the following description in connection with the accompanying drawings in which.

DETAILED DESCRIPTION OF THE INVENTION

Figure 2:
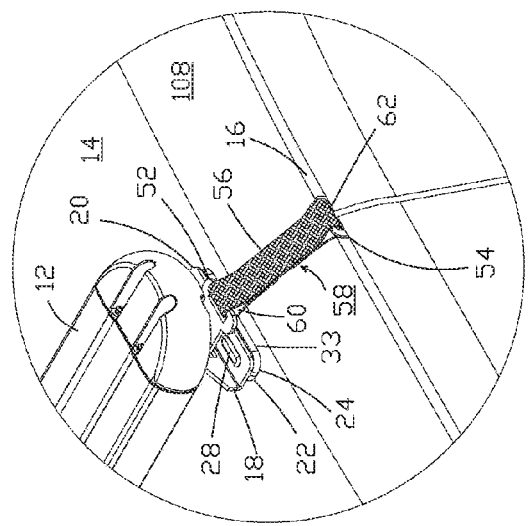
FIG. 2 is an enlarged portion of the view shown in FIG. 1 which is within the circle marked 2-2.
Figure 1:
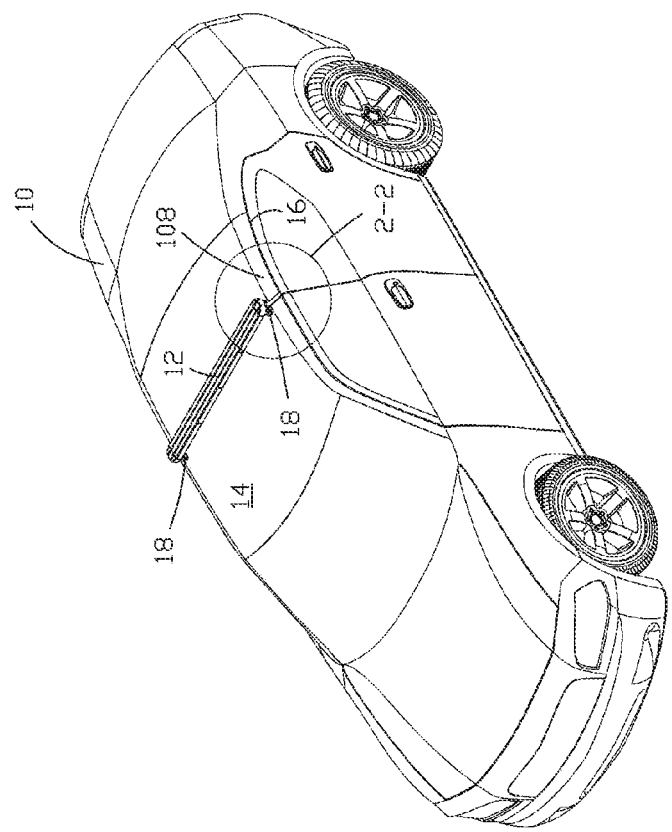
FIG. 1 is a perspective view of a vehicle having a lightbar mounted on the roof thereof using a mounting system in accordance with the invention.

Referring more particularly to the drawings, there is shown in FIGS. 1 and 2 a vehicle 10, such as an emergency response vehicle, namely a police car, having a lightbar 12 mounted on the roof 14 thereof. The edges of the roof 14 have gutters 16, to which the lightbar has a lightbar mounting system having two mounting assemblies 18, each on to opposite edges of the roof 14. If vehicle 10 does not have gutters 16 the attachment may be to the vehicle's door jambs. The assemblies 18 are shown in FIGS. 2, 3, 4, 5 and 6 which portray one of the assemblies 18. These assemblies 18 each have a first bracket 20 with a foot 22, which rests on the roof 14. Foot 22 has a pad 24 of elastomeric (resilient plastic) material along its bottom end 47. Such pad 24 has projections or nibs 28 and 32 which align and snap into oblong openings 30 and hole 34, respectively, provided in foot 22 to attach the pad to the foot (see FIGS. 5 and 5A, and assembled view of FIG. 4). The bottom 33 of pad 24 is placed in contact with the surface of roof 14. The bracket 20 is attached to the bottom of the lightbar 12 by means of a fastener 40. The bracket 20 is bent into a general "Z" shape with a long leg 42 opposed on the base 12a of the lightbar 12. Shorter legs 44 and 46 provide the foot 22 section of the bracket 20.

Figure 3:
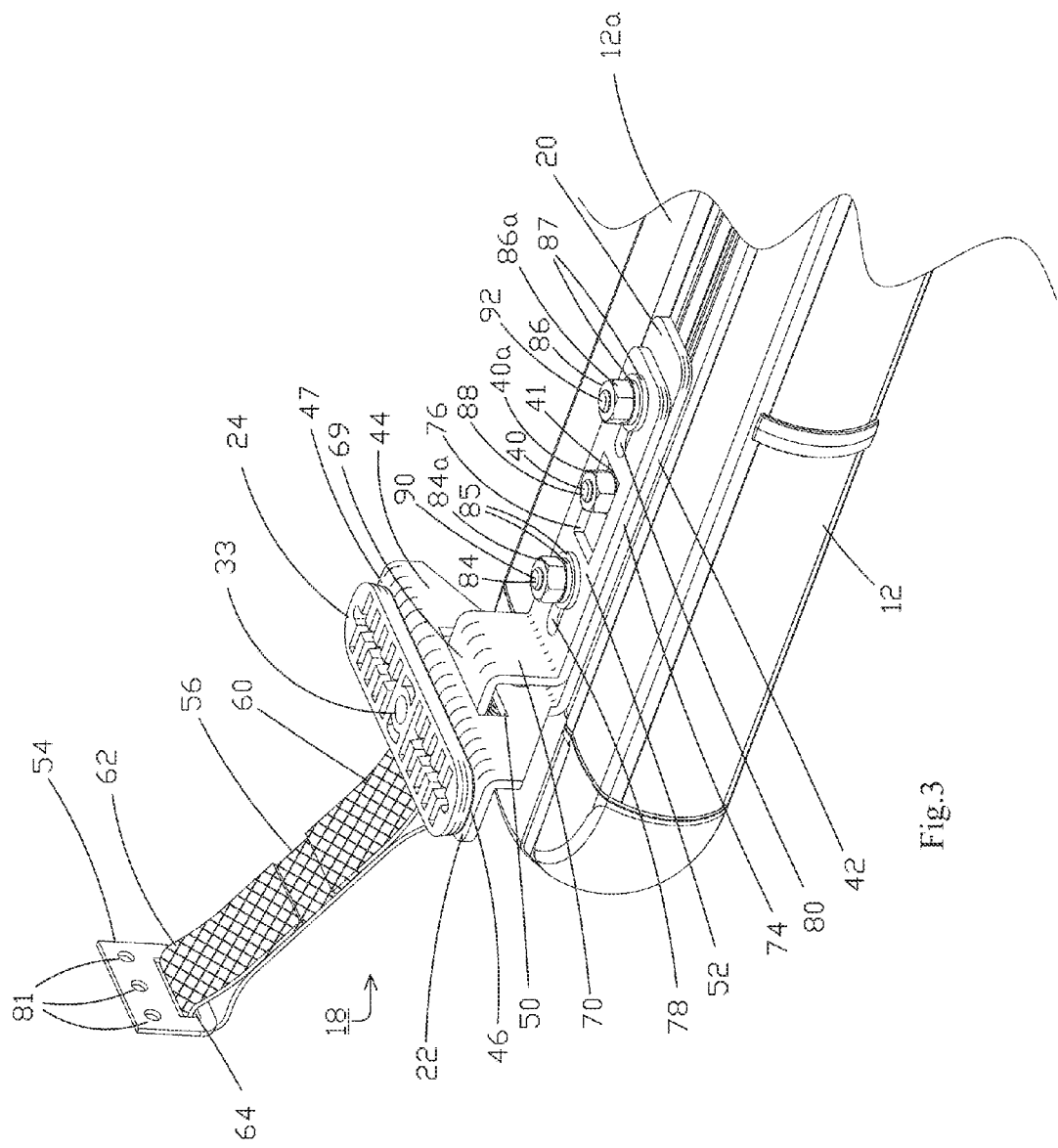
FIG. 3 is a bottom perspective view illustrating one of the lightbar mounting assemblies of the lightbar mounting system of FIG. 1 as attached to the bottom of the lightbar.

As shown in FIG. 3, and as discussed above, the pad 24 is attached to the leg 46 of the foot 22. The leg 44, which is perpendicular to both the legs 42 and 46, has a rectangular hole 50 providing a passage or port through which another bracket 52 extends. The bracket 52 and a bracket 54, which connects bracket 20 to the gutter 16 using a flexible strip 56, constitute a subassembly 58 of the mounting assembly 18. The strip 56 is a belt or strap of flexible material. Preferably the material of the strip 56 is a wire mesh. The opposite ends of the strip 56 have loops 60 and 62. Loop 60 extends and encompasses opening or slot 66 in an oblong portion 68 at one end of a leg 69 of the bracket 52 of the subassembly 58, and loop 62 extends through and encompasses rectangular opening or slot 64 in the bracket 54.

The wire mesh constituting the strip 56 is sufficiently thick so that it enables the strip to be flexible enough to form the loops 60 and 62, while being resistant to cutting by persons who wish to detach the lightbar from the vehicle. The material of the wires of the mesh may be metal, suitably steel wires. Each of loops 60 and 62 being formed after passage of opposing free ends of strip 56 through respective openings 64 and 66, whereby after such passage the free ends of the strip are attached back along the strip, as shown for example in FIG. 5, such as by adhesive, a joint or weld, or other attachment mechanism. The bracket 52 has a bottom leg 74 in addition to the leg 69 having the oblong end 68 through which the loop 60 extends, and an intermediate leg 70 generally perpendicular to the legs 69 and 74.

The bracket 52 also has a rectangular central slot 76 in the leg 74 and a pair of slots 78 and 80 on opposite sides of the central slot 76. The fastener 40 extends through the central slot 76 because there is sufficient clearance between the fastener 40 and the walls of the slot 76 in the leg 74 (see FIG. 3). The bracket 54 which attaches the assembly 18 to the edge of the roof gutter or door jamb utilizes screws 55 in holes 81 in bracket 54 (see also FIG. 5).

Figure 5:
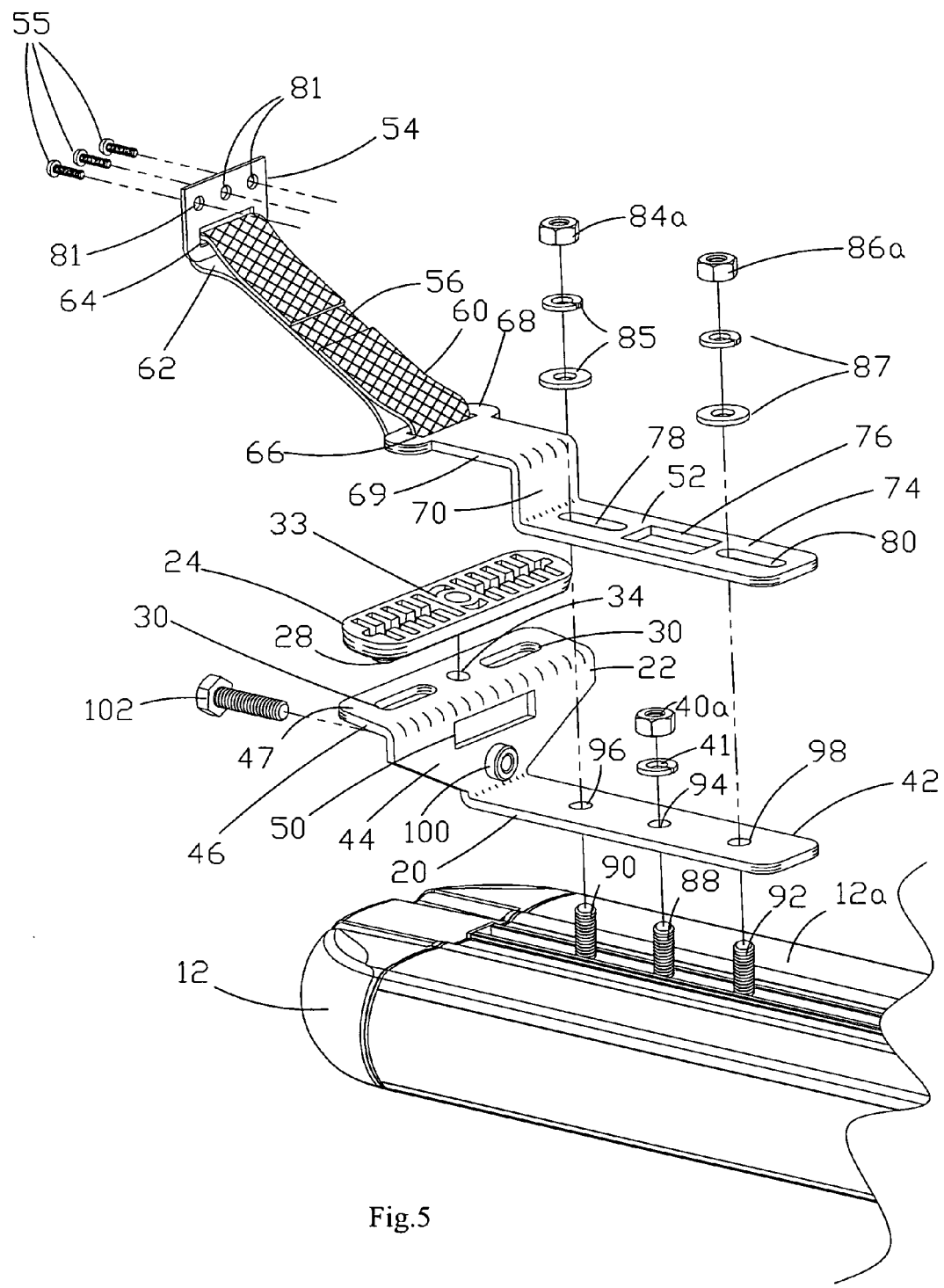
FIG. 5 is an exploded view of the mounting assembly of FIG. 3.

The other bracket 52 of the subassembly 18 extends through the opening 50 of leg 44 of bracket 20. Fastener 40 represents a nut 40a and a bolt 88, which is affixed to lightbar 12 and extends from the bottom or base 12a thereof. Other fasteners 84 and 86 are also provided, where fastener 84 represents a nut 84a and bolt 90, and fastener 86 represents a nut 86a and a bolt 92. FIG. 5 shows such fasteners 40, 84, 86 by their components part in exploded view, and as assembled in other figures. The brackets 20 and 52 are connected together via a floating connection provided by the fasteners 40, 84 and 86, where such floating connection is provided by nuts 40a, 84a, and 86a which rotationally attach to bolts 88, 90 and 92, respectively, which are affixed to the lightbar 12 and extend from the bottom or base 12a thereof (see especially FIG. 5). Preferably, nuts 40a, 84a, and 86a rotationally attached to the bolts 88, 90 and 92, respectively, via washers 41, 85, and 87, respectively.

The bolt 88 passes through an opening 94 in leg 42 of bracket 20 and opening or slot 76 of bracket 52. The bolts 90 and 92 pass through other holes 96 and 98, respectively, in the leg 42 of the bracket 20 and openings 78 and 80, respectively, of bracket 52. The bolt 88 and nut 40a of fastener 40 are smaller in diameter than the width of the rectangular slot 76 as described above, so that fastener 40 passes through slot 76 and can be turned down to fasten bracket 20 to the base or bottom 12a of lightbar 12 when the nut 40a of fastener 40 is tightened on bolt 88. The slots 78 and 80 are slightly wider than the diameter of bolts 90 and 92 and the nuts 84a and 86a of fasteners 84 and 86, respectively. These bolts 90 and 92 are long enough to extend through the leg 74 of the bracket 52 with sufficient clearance to permit the bracket 52 to be moveable (or slidable) on bracket 20, when the nuts 84a and 86a of fasteners 84 and 86 are not tightened, but are loosely screwed onto bolts 90 and 92, respectively. Thus, the combination of fasteners 40, 84 and 86 and slots 76, 78 and 80 provide the floating connection between the subassembly 58 and the rest of assembly 18, and especially the bracket 52 thereof and the bracket 20 which is attached to the lightbar 12.

Figure 4:
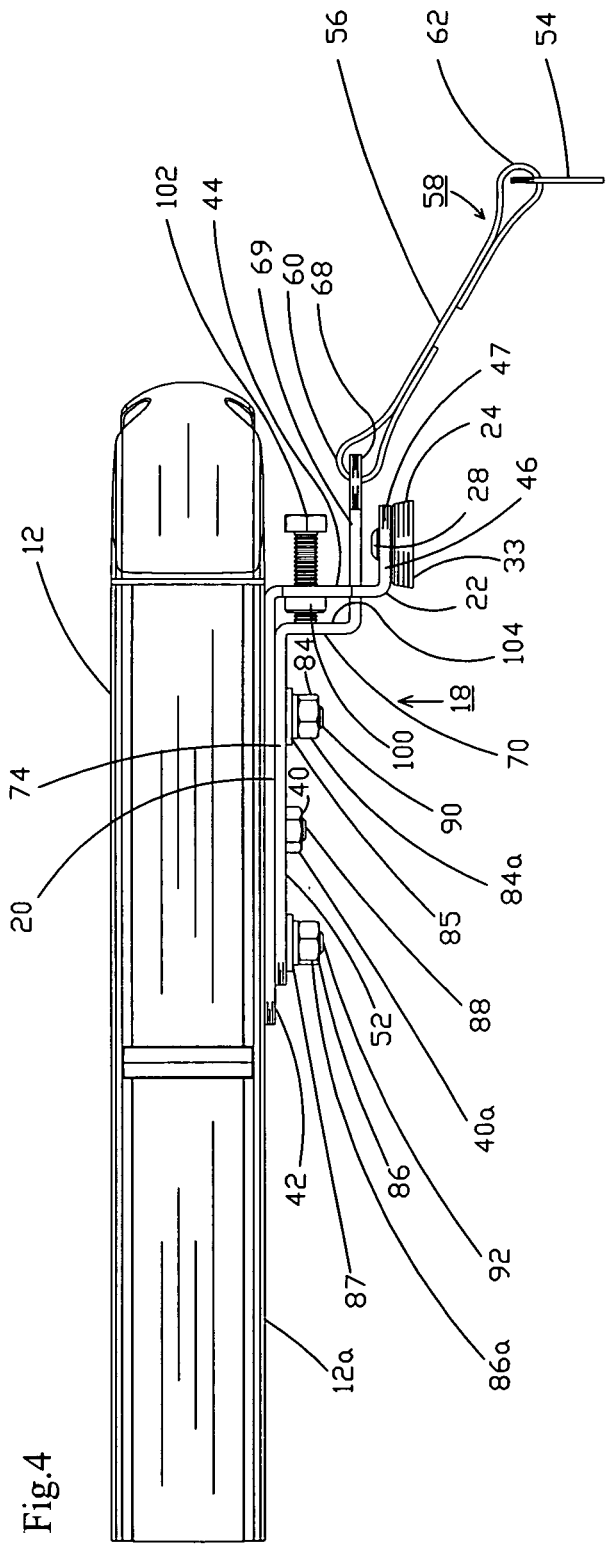
FIG. 4 is a side view of the mounting assembly of FIG. 3 showing the lightbar mounting system attached to the lightbar at the bottom thereof.
Figure 5A:
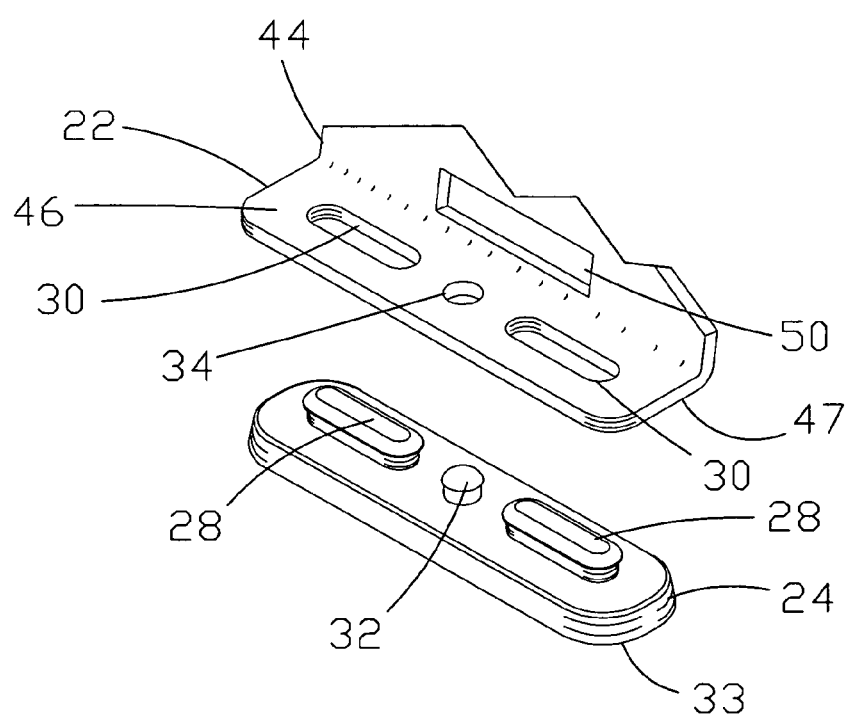
FIG. 5A is a partial exploded view of the mounting assembly of FIG. 3 from the top thereof showing the pad and part of the foot of the mounting assembly.
Figure 6:
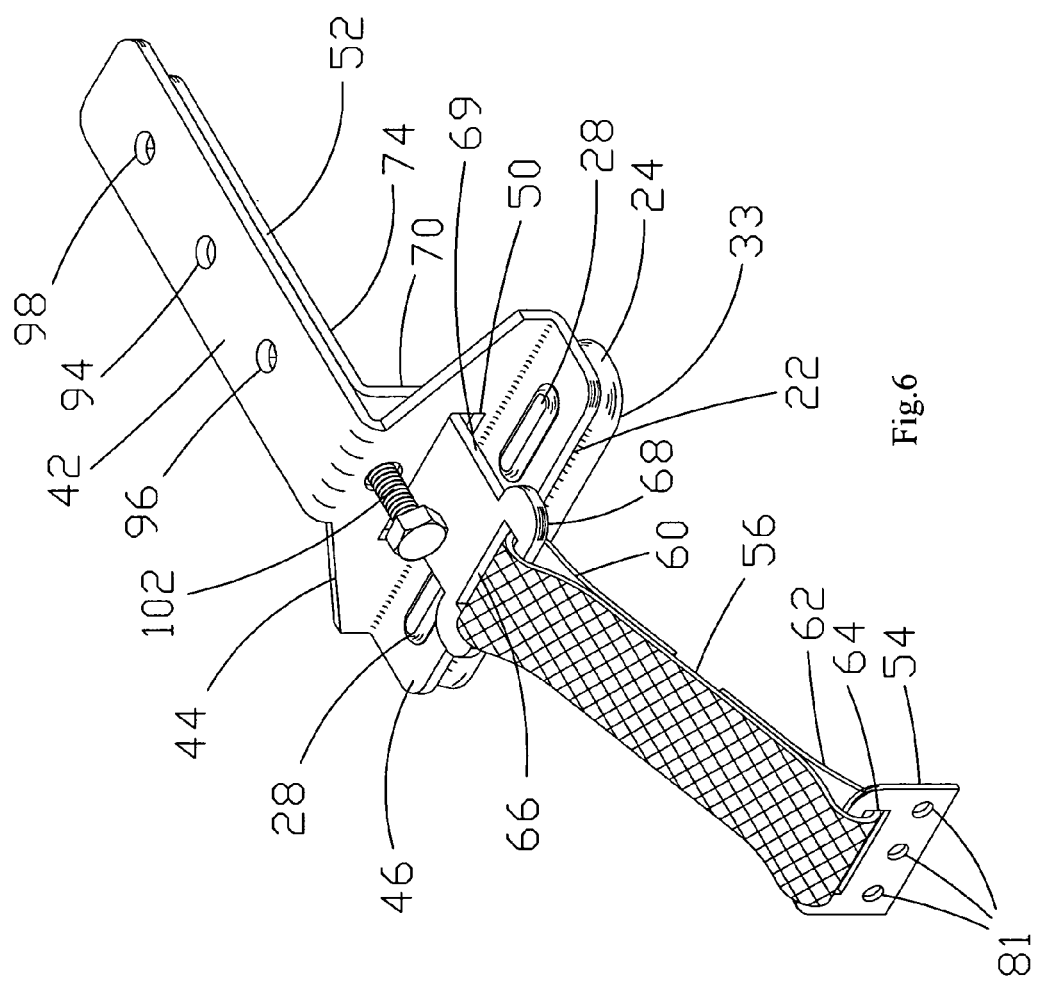
FIG. 6 is a perspective view illustrating the mounting assembly of FIG. 3 apart from a lightbar looking downwardly from the end thereof.

The bracket 52 is moveable longitudinally along the lightbar 12 since the slot 76 is wider than the bolt 88 and fastener 40 when attached thereto, and the slots 78 and 80 are longer and slightly wider than the bolts 90 and 92, respectively. In order to provide means for moving the bracket 52, the leg 44 of bracket 20 has a threaded connection provided by the threaded boss 100 and a bolt 102, which is moveable when turned in threaded boss 100, and bears against an outside surface 104 of the leg 70, as best shown in FIG. 4.

In order to firmly attach the lightbar 12 to the roof 14 of the vehicle 10 the strip 56 is stretched so that it lies flush against the curved surface 108 (at least substantially conforming to such curvature) at the end of the roof 14, as shown best in FIG. 2. The strip 56 therefore accommodates any curvature of the surface of the roof 14 and does away with the need for different strips or brackets or special mechanisms for accommodating roofs of different curvature. After the strip 56 is stretched, the nuts 84a and 86a of the fasteners 84 and 86, respectively, are tightened upon their respective bolts 90 and 92 to clamp the leg 74 of the moveable bracket 52 and the lightbar bottom 12 to the mounting assembly 18. Also the disposition of the strip 56 flush against the roof 14 reduces any extraneous noise due to wind or air movement when the vehicle 10 travels along a roadway.

For example, lightbar 12 installation onto vehicle 10 may be provided by lightbar 12 being positioned prior to placement onto roof 14 so that a first set of bolts 88, 90, and 92 extending from the left side of base 12a, and a second set of bolts 88, 90, and 92 extending from the right side of base 12a, are accessible. A left one of mounting assembly 18 is then located so that its bracket 52 is positioned through opening 50 of bracket 20, and the first set of bolts 88, 90, and 92 are extended through holes 94, 96, and 98, of bracket 20, and openings 76, 78, and 80 of bracket 52, respectively. Nuts 40a, 84a, and 86a are then tightened over their respective bolts 88, 90, and 92, via their respective washers, where nut 40a rigidly attaches bracket 20 to lightbar 12, and nuts 84a and 86a are only loosely tightened so that bracket 52 can slide as needed with respect to bracket 20 by turning bolt 102 that extends between brackets 20 and 52. Such slidable positioning being defined by longitudinal dimension of openings 78 and 80 of bracket 52. The right one of mounting assembly 18 is then similarly attached to lightbar 12 along the second set of bolts 88, 90, and 92.

With both left and right mounting assemblies 18 coupled to lightbar 12, the lightbar 12 is positioned onto roof 12, via pads 24 of feet 22, and the bracket 54 and strip 56 of the left and right mounting assemblies 18 are extended towards and then attached by screws to left and right gutters or door jambs, respectively, of vehicle 10. Bolts 102 of the left and right mounting assemblies 18 are turned to first enable such attachment, and then turned to tighten the strips 56 of the respective assemblies so that the strips stretch and conform to the curvature of the roof exterior surface. Nuts 84a and 86a of the left and right mounting assemblies 18 are then fully tightened.

Brackets 20 and 52 may be formed of metal bent and/or welded to provide their respective legs with drilled or cut openings/holes, as described herein and shown in the figures. The strip 56 is made of flexible and stretchable material(s), but may alternatively be non-stretchable (or partially stretchable) material(s) and can similarly conform at least substantially between brackets 54 and end 68 of bracket 52 to a vehicle roof by being made taut when bracket 52 is fixed in position with respect to bracket 20. Although the lightbar 12 is shown in the figures, other roof mountable lightbars (of same or different size) with comparable bolts 88, 90, and 92 along the bar of their left and right sides may similarly be attached to roofs of vehicles using the mounting system of assemblies 18 of the present invention.

From the foregoing description it will be apparent that there has been provided an improved lightbar mounting system which does away with the need for special mechanisms or brackets to accommodate for different curvatures of different vehicles roofs' thereof. Variations and modifications in the herein described system, apparatus, and method will undoubtedly suggest themselves to those skilled in the art. Accordingly the foregoing description should be taken as illustrative and not in a limiting sense.

What is claimed is:

1. An apparatus for mounting a lightbar on a curved surface of a roof of a vehicle comprising:
    a pair of mounting assemblies for mounting the lightbar at opposite ends thereof;
    each of said assemblies comprises:
        a strip of flexible belt material;
        a first bracket attachable to an edge of the roof;
        a second bracket attachable to the bottom of the lightbar and having a foot extending away from the bottom of the lightbar to the roof;
        a third bracket moveably mounted upon said second bracket via fasteners extending through said third bracket and having a first and second position one of which positions enables said third bracket to move and the other of said positions clamping said third bracket and said second bracket together, wherein said first and third brackets have openings in which loops at opposite ends of said strip extend, and said strip and said first and third brackets constituting a subassembly of said mounting assembly; and
        means for stretching said strip over the surface of the roof, said fasteners being disposed in said second position after said strip is stretched thereby mounting said lightbar upon said roof.

2. The apparatus according to claim 1 wherein a mesh of wires constitutes said strip and forms said strip.

3. The apparatus according to claim 2 wherein said wires in said mesh are made of metal of sufficient strength to counteract cutting of said strip.

4. The apparatus according to claim 1 wherein said third bracket has a first leg having said opening for one of said loops of said strip, and which is moveable through a passage of said second bracket, said third bracket having a second leg presenting a surface opposed to said foot, and third bracket having a third leg disposed and moveable upon said second bracket.

5. The apparatus according to claim 4 wherein said second bracket has a plurality of openings through which bolts attached to said lightbar extend, and said bolts and nuts thereon comprise said fasteners, said plurality of openings being aligned with a plurality of slots in said third bracket of sufficient length to enable movement of said third bracket, stretching of said strip, said fasteners also comprising said nuts which are rotatable on said bolts, said nuts extending through one of said slots which is wider than said one of said nuts and is the one of said fasteners which attaches said second bracket to said lightbar via one of said bolts while allowing movement of said third bracket to stretch said strip, and another of said nuts rotatable on another of said bolts between said first and second positions to enable movement of said third bracket and to clamp said third bracket to said second bracket and also to said lightbar.

6. The apparatus according to claim 5 wherein said means to stretching said strip is a bolt turnable in said foot and extending to said surface of said second leg of said third bracket for moving said third bracket away from said foot to stretch said strip.

7. The apparatus according to claim 1 further comprising a pad on the end of said foot via which said mounting assembly and said lightbar rests on said roof.

8. A method for mounting lightbar on a curved roof a vehicle which comprises the steps of:
    looping a flexible strap around an attachment to the roof at an edge thereof;
    looping the strap over the roof and around a bracket coupled to the lightbar so that said bracket is movable with respect to said light bar when set upon the roof;
    moving the bracket to stretch the strap to conform at least a portion thereof to the roof; and
    fixing the moveable bracket to the lightbar.

9. A method for mounting lightbar on a curved roof a vehicle which comprises the steps of:
    looping a flexible strap around an attachment to the roof at an edge thereof;
    looping the strap over the roof and around a bracket moveably attached to the lightbar;
    moving the bracket to stretch the strap to conform to the roof;
    fixing the moveable bracket to the lightbar;
    attaching the lightbar to another bracket having a pad resting on the roof; and
    providing a floating connection between said bracket around which the strap is looped and said another bracket by moving the bracket around which the strap is looped with respect to said another bracket, wherein said fixing step is carried out by connecting said bracket around which it is looped to said another bracket and to said lightbar.

10. The method according to claim 9 wherein said steps of looping flexible strap, looping of the strap over the roof, moving, and fixing steps are carried out at opposite ends of the lightbar along different sides of said roof with different ones of said strap and bracket.

11. The method according to claim 9 further comprising providing said floating connection with a bolt attached to said lightbar extending to a slot wider and longer than a nut on said bolt which clamps said another bracket to said lightbar in carrying out said fixing step with at least one other bolt extending from said lightbar to said another bracket and said bracket around which the strap is looped.

12. The method according to claim 8 further comprising the step of providing said strap as a flexible belt constituted of a mesh of wires of a material which resists cutting.

13. An apparatus for mounting a lightbar onto the vehicle roof with respect to one of the left of right sides thereof comprising:
  a first bracket attachable to one of a gutter or door jamb along an edge of the roof of a vehicle;
  a second bracket attachable to the base of a lightbar along the left or right side thereof, said second bracket comprising a foot positionable upon a roof of a vehicle;
  a third bracket movable with respect to said second bracket to a fixed position with respect to said second bracket; and
  a flexible member coupled between said first bracket and said third bracket in which when said first bracket is attached to the edge of the roof of a vehicle and said second bracket is attached to a lightbar positioned against the roof of a vehicle, movement of said third bracket to said fixed position with respect to said second bracket enables at least a portion of said flexible member to conform to the curvature of the roof of the vehicle between said first bracket and said third bracket.

14. The apparatus according to claim 13 wherein said flexible member is provided by a strap having a mesh of wires.

15. The apparatus according to claim 13 wherein said foot comprises a pad supporting said foot when positioned against the roof of a vehicle.

16. The apparatus according to claim 13 wherein said third bracket is coupled to said second bracket and then movable along said second bracket until being retained at said fixed position.

17. The apparatus according to claim 13 wherein said third bracket moves with respect to the second bracket along a dimension extending longitudinally along the light bar.

18. The apparatus according to claim 13 wherein the third bracket at said fixed position enables the strap to lay substantially against the roof between said first and third brackets.

19. The method according to claim 8 wherein said moving step further comprises moving the bracket along a dimension extending longitudinally along the light bar.

20. The method according to claim 8 wherein said moving step further comprises moving the bracket to stretch the strap so that at least a portion of said strap conforms to curvature of the roof by lying substantially against the roof.

21. The method according to claim 8 further comprising the step of attaching the lightbar to another bracket having a foot upon the roof, wherein said moving step moves said bracket with respect to said another bracket until said fixing step positionally fixes said movable bracket to said lightbar by fixing said bracket to said another bracket.

* * * * *